(12) United States Patent
Park

(10) Patent No.: US 7,270,081 B2
(45) Date of Patent: Sep. 18, 2007

(54) AUTOMATIC PET FOOD DISPENSING DEVICE

(76) Inventor: Sung Ho Park, 14730 Willow Creek Ln., Chino Hills, CA (US) 91709

( * ) Notice: Subject to any disclaimer, the term of this patent is extended or adjusted under 35 U.S.C. 154(b) by 146 days.

(21) Appl. No.: 11/062,918

(22) Filed: Feb. 22, 2005

(65) Prior Publication Data

US 2006/0185606 A1   Aug. 24, 2006

(51) Int. Cl.
*A01K 1/00* (2006.01)
(52) U.S. Cl. .................................. 119/57.92
(58) Field of Classification Search ............ 119/51.01, 119/57.92, 57.1, 57.91
See application file for complete search history.

(56) References Cited

U.S. PATENT DOCUMENTS

| | | | |
|---|---|---|---|
| 1,274,548 A | | 8/1918 | Holnagel et al. |
| 2,677,350 A | | 5/1954 | Prestidge et al. |
| 4,513,688 A | * | 4/1985 | Fassauer .................. 119/57.1 |
| 4,665,862 A | | 5/1987 | Pitchford, Jr. |
| 4,735,171 A | | 4/1988 | Essex |
| 4,823,738 A | * | 4/1989 | Gold ...................... 119/51.01 |
| 4,922,857 A | | 5/1990 | Arentoft |
| 5,031,575 A | | 7/1991 | Phillips |
| 5,363,805 A | | 11/1994 | Wing |
| 5,647,299 A | | 7/1997 | Pearson-Falcon |
| 5,775,255 A | | 7/1998 | Louviere, III |
| 5,979,360 A | | 11/1999 | Tharp |
| 6,135,056 A | | 10/2000 | Kuo |
| 6,192,831 B1 | | 2/2001 | Brunse |
| 6,401,657 B1 | | 6/2002 | Krishnamurthy |

FOREIGN PATENT DOCUMENTS

| | | |
|---|---|---|
| DE | 3112743 A1 | 10/1982 |
| DE | 29714072 U1 | 10/1997 |
| FR | 2599722 A1 | 12/1987 |

* cited by examiner

*Primary Examiner*—Teri Pham Luu
*Assistant Examiner*—Willie Berry, Jr.
(74) *Attorney, Agent, or Firm*—Christie, Parker & Hale, LLP.

(57) ABSTRACT

An pet food dispensing device includes a dispenser, an outer case, a pet food container, a slant guide, a driving device, and dispensing spouts. The dispenser includes a shaft, a dispensing disc, and a stirrer. The dispensing disc includes a top and bottom layers, which are positioned adjacently. The top layer of the dispensing disc includes one or more bumps on the top surface. The stirrer of the pet food dispenser includes a first flap extended from the first edge of the bottom layer of the dispensing disc, and the first flap is bent downwardly below the horizontal plane. In another embodiment, the stirrer includes an inner case and an elastic string member adjacently below the dispensing disc. The angle of the arc recess defined by the top and bottom layers varies from zero to one hundred eighty degrees. An outer case houses all parts.

17 Claims, 21 Drawing Sheets

AUTOMATIC PET FOOD DISPENSING DEVICE

BACKGROUND OF THE INVENTION

The present invention relates to an improved automatic pet food dispensing device. More particularly, this invention relates to an automatic pet food dispensing device that will prevent the device from jamming in dispensing the pet food.

The related U.S. patent application Ser. No. 10/620,662 by the inventor of this invention is incorporated by reference into this disclosure as if fully set forth herein.

Pet food dispensers of prior arts have a serious problem, jamming, among many others. Since it was supposed to be automatic, the jammed pet food dispensing device is outright trouble to the pets and to the pet owners who are trusting the device and traveling for a couple of days.

The fact that the grains of pet food is small compared to the opening through which the pet food is led does not guarantee a smooth flow intended by the designer of the pet food dispensing device. The interaction between pet food particles and the inner wall of the container or the edges of the opening and even among the food particles generates a bunch of complex behaviors of the granular media, which is one of the major subjects of research for nonlinear dynamics. The granular particles may behaves like a liquid under some conditions such as the size and shape of the individual particle, and be packed into a substantial solid block.

Accordingly, a need for an improved pet food dispensing device has been present for a long time considering the growing number of pets all around the world. This invention is directed to solve the problems and satisfy the long-felt need.

SUMMARY OF THE INVENTION

The present invention contrives to provide an automatic pet food dispensing device that solves the disadvantages of the prior art.

Accordingly, it is an object of the present invention to provide an automatic pet food dispensing device that prevents the jamming of the feeder by the food.

To achieve the above objectives, an automatic pet food dispensing device includes a pet food dispenser and an outer case housing the parts.

The pet food dispenser includes a shaft, a dispensing disc, and a stirrer for stirring jammed pet food particles. The dispensing spouts leads the pet food from the space formed by the bottom of dispensing disc.

The dispensing disc includes a top layer and a bottom layer. And the top and bottom layers of the dispensing disc are positioned adjacently. The top layer comprises a top cutout portion and the bottom layer comprises a bottom cutout portion. The area of opening formed by the top and bottom cutout portions adjustable. The top layer of the dispensing disc includes one or more bumps on the top surface.

In an embodiment of the invention, the stirrer of the pet food dispenser includes a first flap extended from the first edge of the bottom layer of the dispensing disc, and the flap is bent downwardly below the horizontal plane.

The top and bottom layers have substantially semi-circular shape, and each of the layers includes a first edge and a second edge. The angle of the arc recess defined by the second edge of top layer and the first edge of the bottom layer varies from zero to one hundred eighty degrees.

The stirrer is made of material with flexibility.

The shaft of the pet food dispenser includes a cylinder portion, a stopper ring portion, and a connecting cylinder portion. The shaft is fixed securely to the top layer of the dispensing disc and engaged with the bottom layer of the dispensing disc with a predetermined friction. The stopper ring portion is fixed at a predetermined position along the cylinder portion to keep the top and bottom layers of the dispensing disc at the predetermined position. The connecting cylinder portion comprises a first end, and a second end, and is fixed with the cylinder portion. Also, the connecting cylinder portion includes an inverted-L shaped slit at the second end. The second end of the connecting cylinder portion is engaged with the driving device. The cylinder portion includes external threads, and the stopper ring portion and the connecting cylinder portion includes internal threads matching with the external threads of the cylinder portion.

The second edge of the top layer of the dispensing disc may include a second flap bent downwardly below the horizontal plane to provide additional stirring of the pet food.

In another embodiment of the invention, the stirrer of the pet food dispenser includes a string member. The pet food dispensing device further includes an inner case. The string member straddles on grooves provided on the upper perimeter of the inner case of the pet food dispenser. The stirrer is made of material with high elasticity.

The shaft of the pet food dispenser includes a head portion, a cylinder portion, partially flattened tail portion, and is fixed securely to the top layer of the dispensing disc and engaged with the bottom layer of the dispensing disc with a predetermined friction.

The top layer has substantially semi-circular shape and the bottom layer comprises a cutout portion, and each of the layers includes a first edge and a second edge of the openings. The angle of the arc recess defined by the second edge of top layer and the first edge of the bottom layer varies from zero to one hundred eighty degrees.

In each of the above embodiments, the automatic pet food dispensing device, further includes a pet food container a pet food container, a slant guide, a driving device for powering the pet food dispenser, and one or more dispensing spouts.

The slant guide of the pet food dispenser has a downhill slope with a predetermined angle toward the dispensing spouts, and is integrally formed with the outer case of the pet food dispenser.

The bumps on the top layer of the dispensing disc are radial and protruding upward. The radial bumps have a cross-sectional shape of isosceles triangle or saw-tooth tilted to the direction of rotation of the dispensing disc.

The automatic pet food dispensing device further includes a plurality of supporting horizontal legs long enough to prevent toppling along the rim of the bottom of the pet food dispensing device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
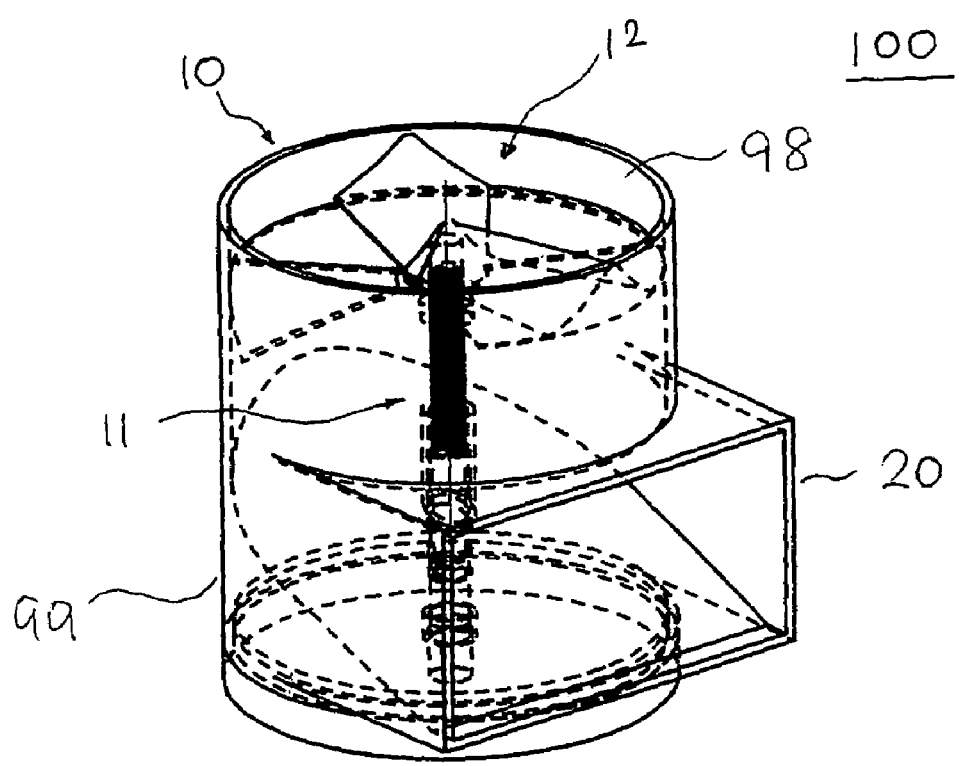
FIG. 1 is a perspective view of a first embodiment of a pet food dispensing device according to the invention.
Figure 2:
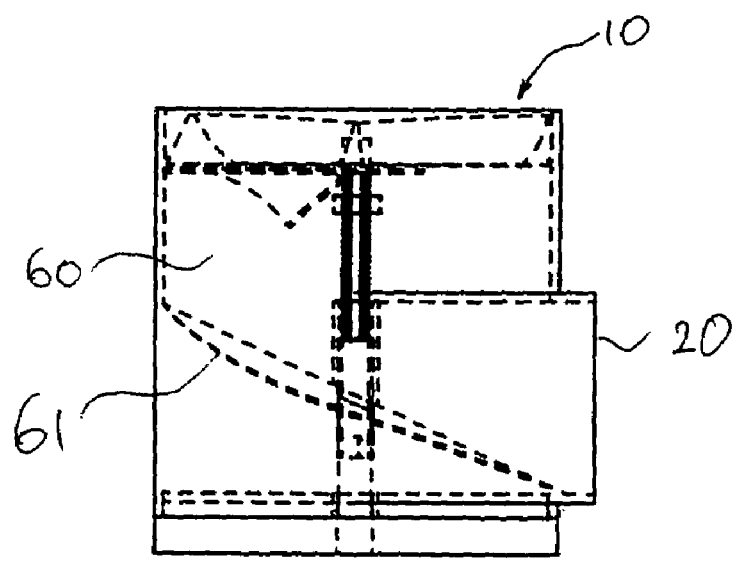
FIG. 2 is a side elevation view of the pet food dispensing device.
Figure 3:
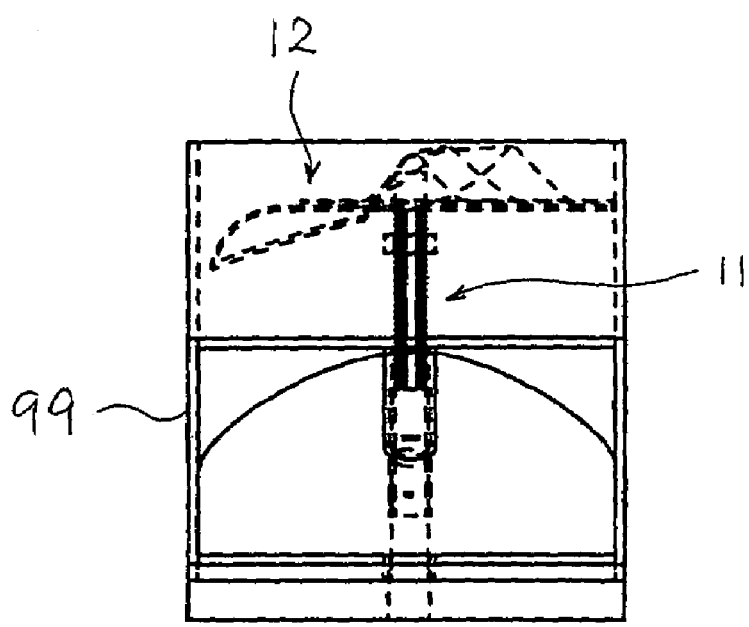
FIG. 3 is a front elevation view of the pet food dispensing device.
Figure 4:
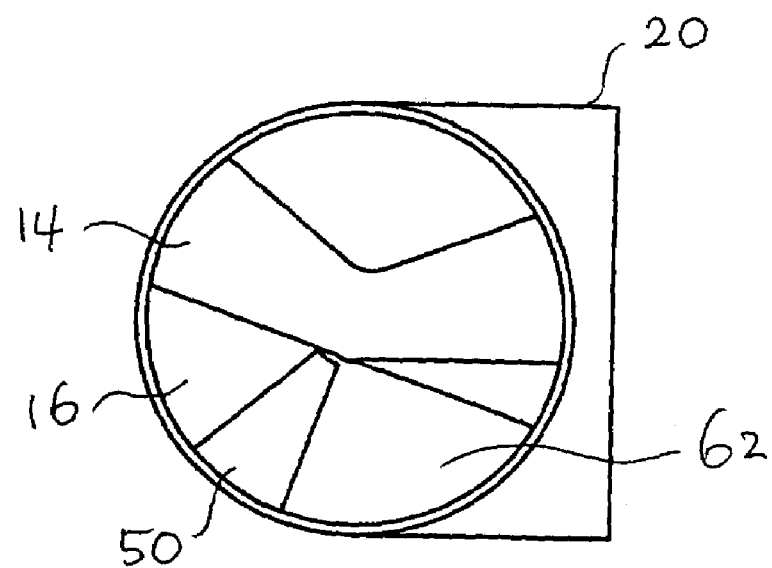
FIG. 4 is a plan view of the pet food dispensing device.
Figure 5:
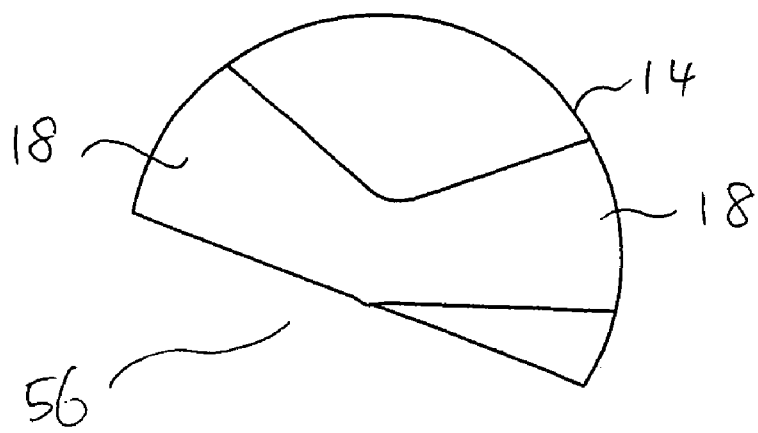
FIG. 5 is a plan view of the top layer of the pet food dispensing disc.
Figure 6:
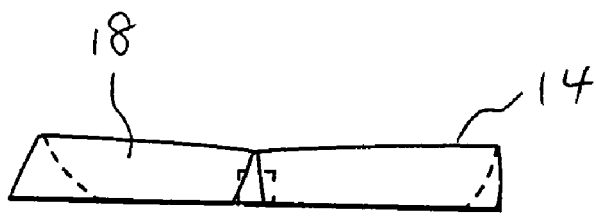
FIG. 6 is a side elevation view of the top layer of the pet food dispensing disc.

FIGS. 1 through 20 show a first embodiment of the invention.

In the first embodiment of the invention, an automatic pet food dispensing device 100 includes a pet food dispenser 10 and an outer case 99 housing the parts.

The pet food dispenser 10 includes a shaft 11, a dispensing disc 12, and a stirrer 30 (refer to FIG. 8) for stirring jammed pet food particles. The dispensing spouts 20 leads the pet food from the space 60 formed by the bottom of dispensing disc 12.

As shown in FIGS. 1 through 4, the dispensing disc 12 includes a top layer 14 and a bottom layer 16. And the top and bottom layers 14, 16 of the dispensing disc 12 are positioned adjacently. The top layer 14 comprises a top cutout portion 56 and the bottom layer 16 comprises a bottom cutout portion 57. The area of opening or arc recess 62 formed by the top and bottom cutout portions 56, 57 adjustable. The top layer 14 of the dispensing disc 12 includes one or more bumps 18 on the top surface.

Figure 7:
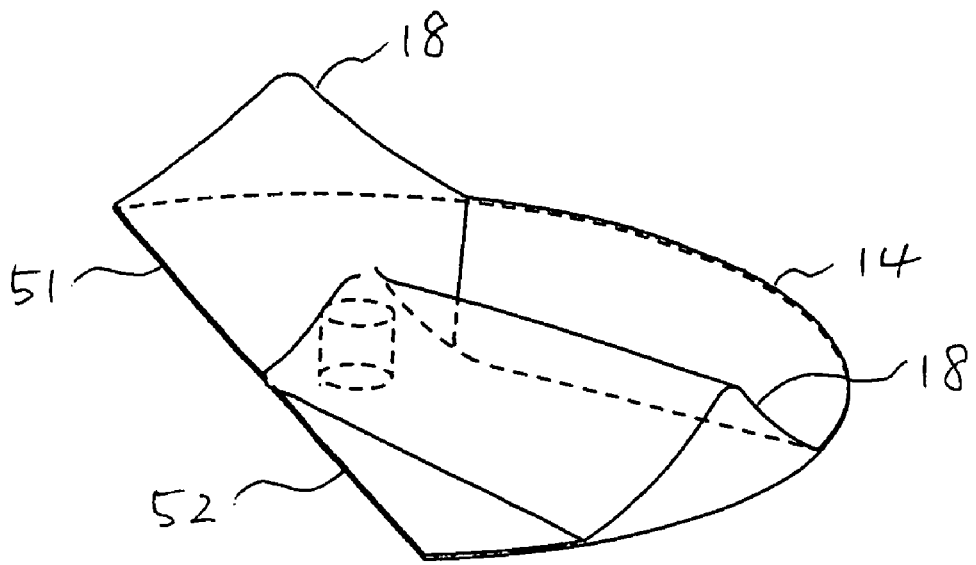
FIG. 7 is a perspective view of the top layer of the pet food dispensing disc.
Figure 8:
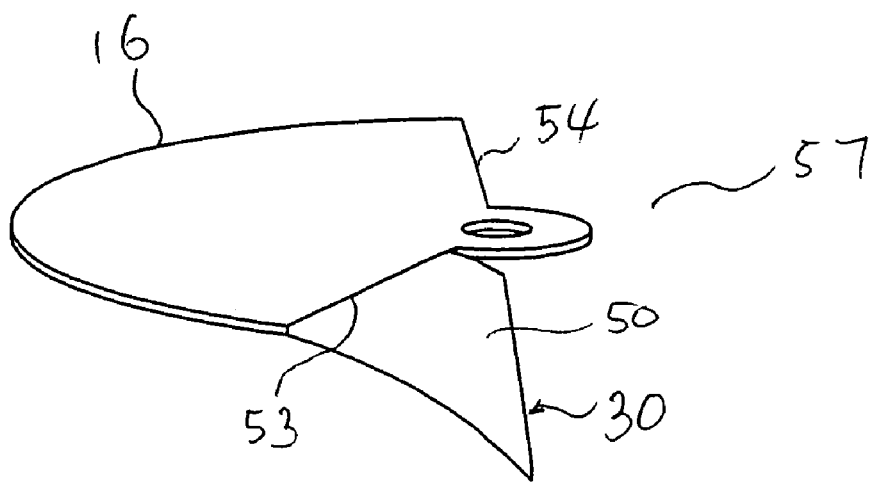
FIG. 8 is a perspective view of the bottom layer of the pet food dispensing disc.
Figure 9:
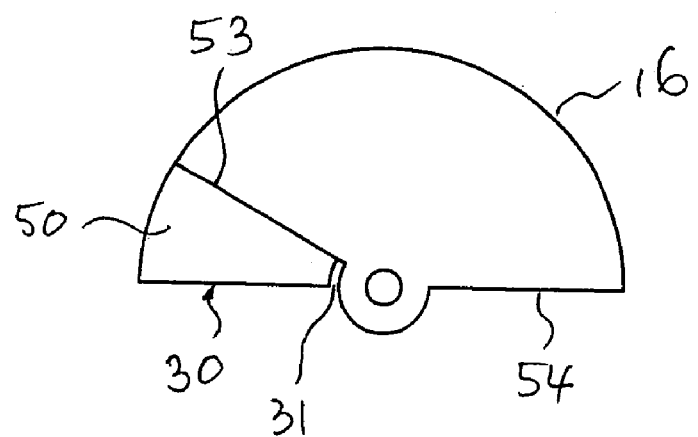
FIG. 9 is a plan view of the bottom layer of the pet food dispensing disc.
Figure 10:
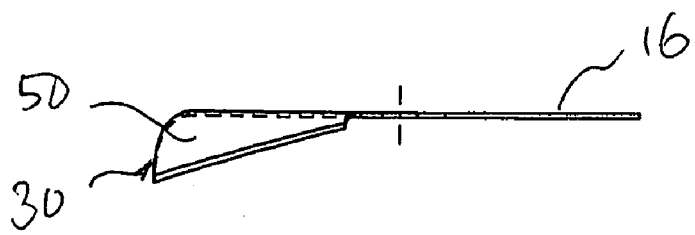
FIG. 10 is a side elevation view of the bottom layer of the pet food dispensing disc.
Figure 11:
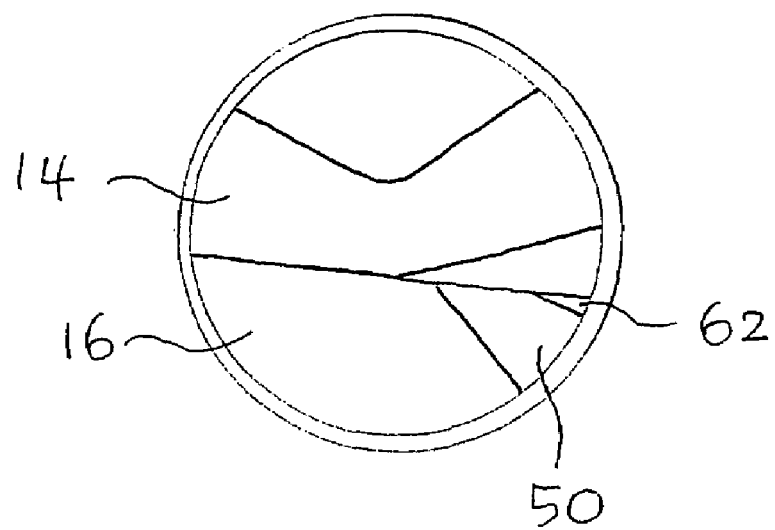
FIG. 11 is a plan view of the pet food dispenser with closed arc recess.

As shown in FIGS. 5 through 10, the top and bottom layers 14, 16 have substantially semi-circular shape, and each of the layers 14, 16 includes a first edge 51, 52 and a second edge 53, 54 as shown in FIGS. 7 and 8. The stirrer 30 of the pet food dispenser 12 includes a first flap 50 extended from the first edge 53 of the bottom layer 16 of the dispensing disc 12, and the first flap 50 is bent downwardly below the horizontal plane.

Figure 12:
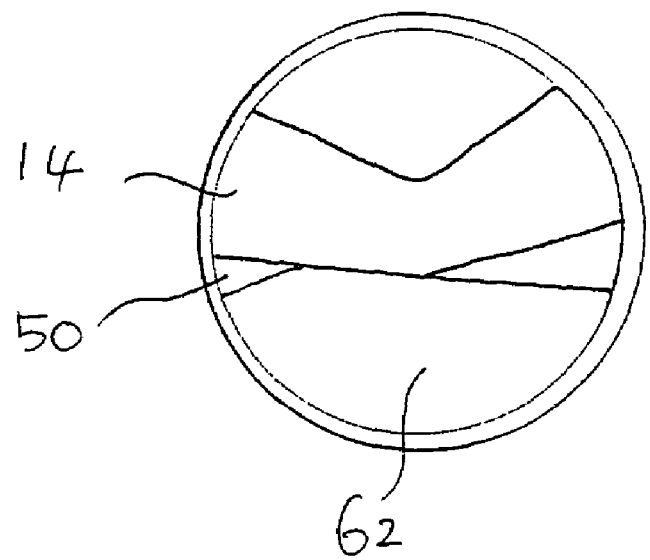
FIG. 12 is a plan view of the pet food dispenser with fully opened arc recess.
Figure 13:
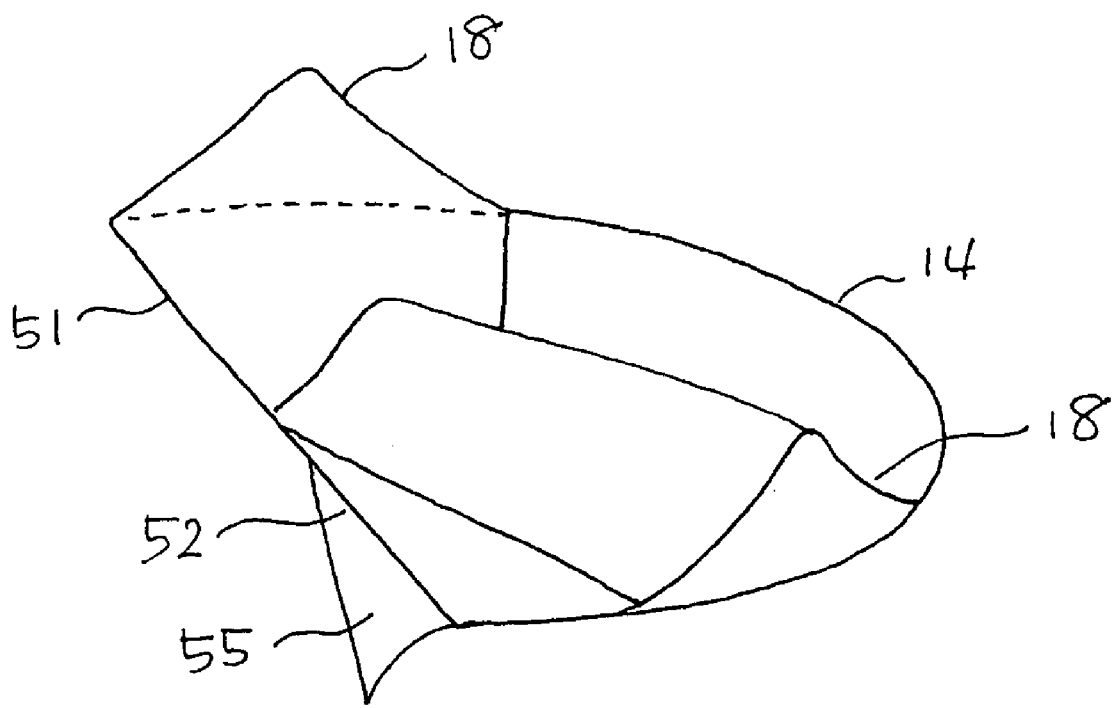
FIG. 13 is a perspective view of the top layer of the dispensing disc with a second flap.

The angle of the arc recess 62 defined by the second edge 52 of top layer 14 and the first edge 53 of the bottom layer 16 varies from zero (refer to FIG. 11) to one hundred eighty degrees (refer to FIG. 12).

The first flap 50 is made of material with flexibility.

Figure 14:
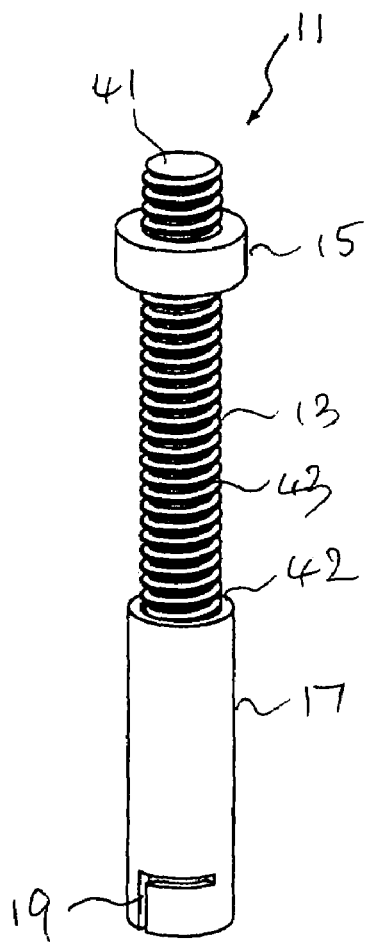
FIG. 14 is a perspective view of the shaft of the pet food dispenser.
Figure 15:
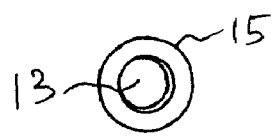
FIG. 15 is a plan view of the shaft of the pet food dispenser.
Figure 16:
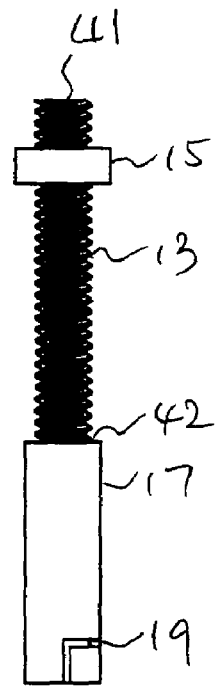
FIG. 16 is a side elevation view of the shaft of the pet food dispenser.

As shown in FIG. 14, the shaft 11 of the pet food dispenser 10 includes a cylinder portion 13, a stopper ring portion 15, and a connecting cylinder portion 17. The shaft 11 is fixed securely to the top layer 14 of the dispensing disc 12 and engaged with the bottom layer 16 of the dispensing disc 12 with a predetermined friction. The angle/size of the arc recess/opening 62 can be adjusted. The stopper ring portion 15 is fixed at a predetermined position along the cylinder portion 13 to keep the top and bottom layers 14, 16 of the dispensing disc 12 at the predetermined position. The connecting cylinder portion 17 includes a first end 41 and a second end 42, and is fixed with the cylinder portion 13. Also, the connecting cylinder portion 17 includes an inverted-L shaped slit 19 at the second end 42. The second end 42 of the connecting cylinder portion 17 is engaged with the driving device (not shown). The cylinder portion 13 includes external threads 43, and the stopper ring portion 15 and the connecting cylinder portion 17 include internal threads (not shown) matching with the external threads 43 of the cylinder portion 13.

Alternatively, the second edge 52 of the top layer 14 of the dispensing disc 12 may include a second flap 55 (refer to FIG. 13) bent downwardly below the horizontal plane to provide additional stirring of the pet food.

The bottom layer 16 of the dispensing disc 12 includes a notch, preferably a circular slit, 31 around the center, wherein the extent of the circular slit 31 corresponds to the bending part of the bottom layer 16, the flap 50. The stirrer 30 is made of material with flexibility.

Figure 17:
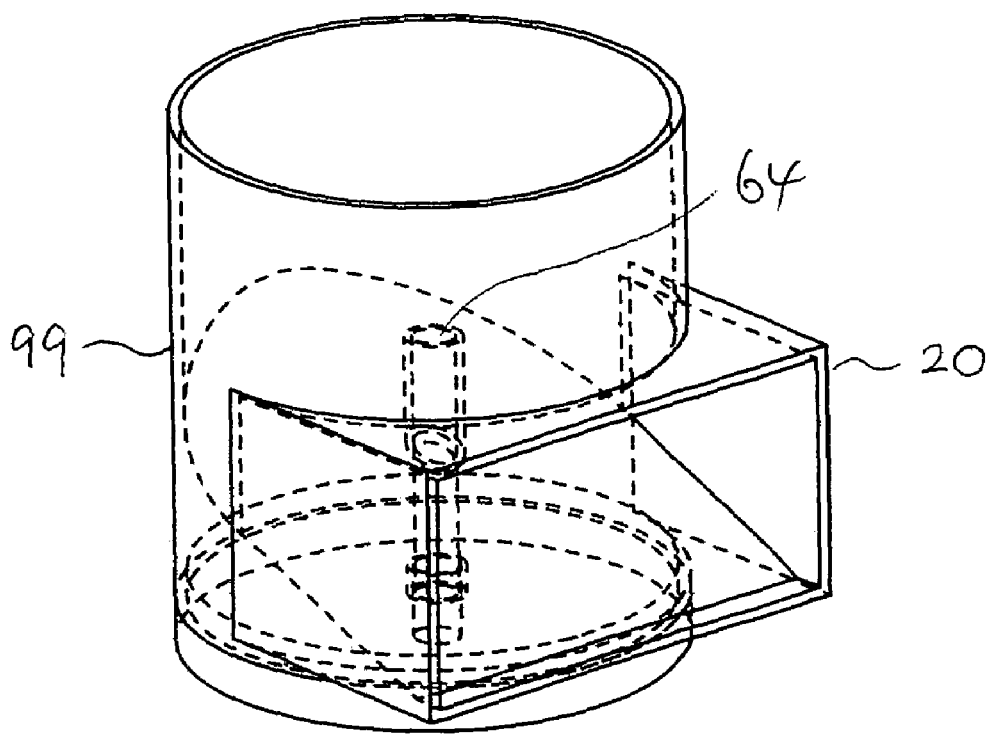
FIG. 17 is a perspective view of an outer case.
Figure 18:
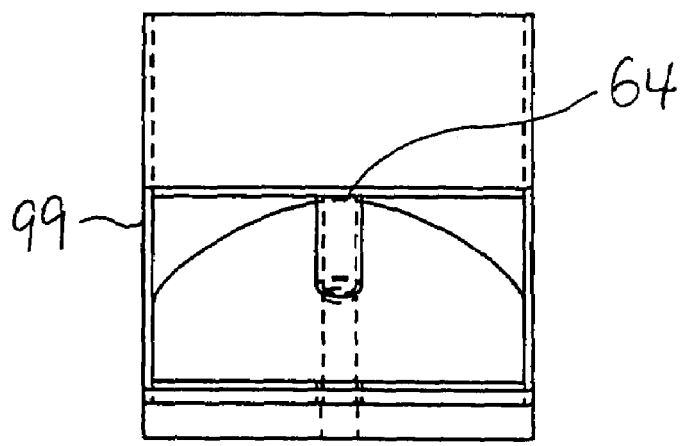
FIG. 18 is a front elevation view of the case.
Figure 19:
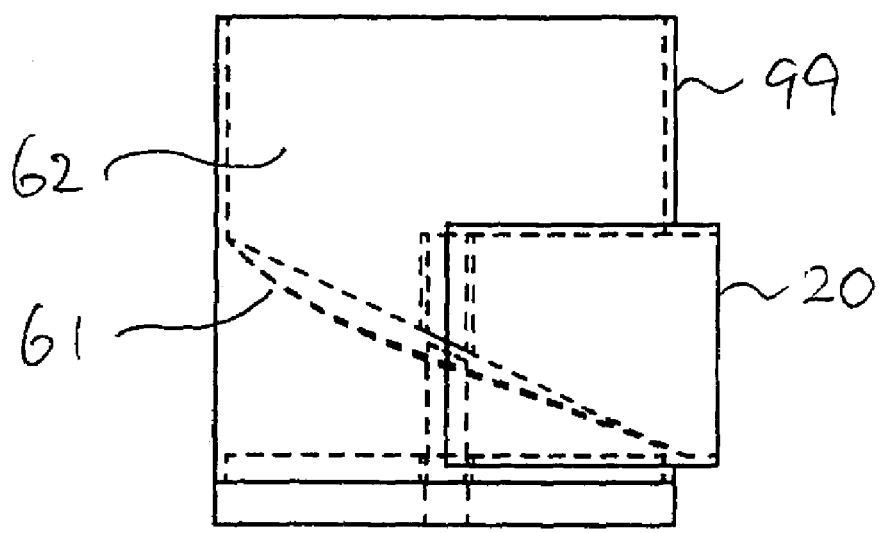
FIG. 19 is a side elevation view of the case.
Figure 20:
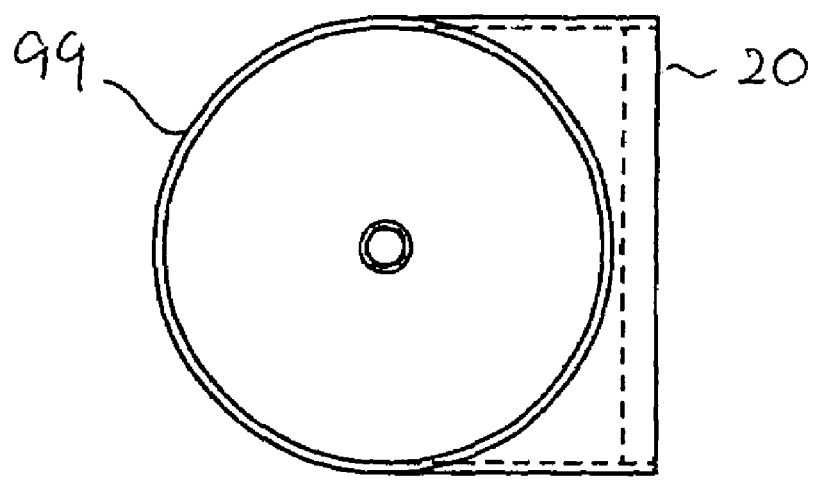
FIG. 20 is a plan view of the case.
Figure 21:
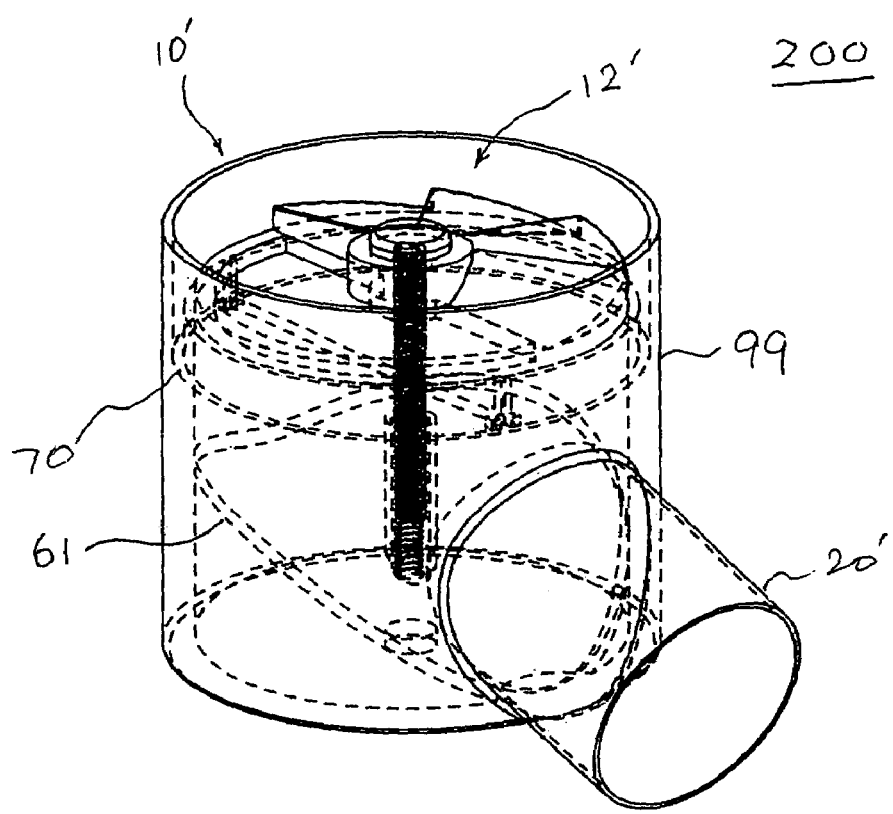
FIG. 21 is a perspective view of a second embodiment of a pet food dispensing device according to the invention.
Figure 22:
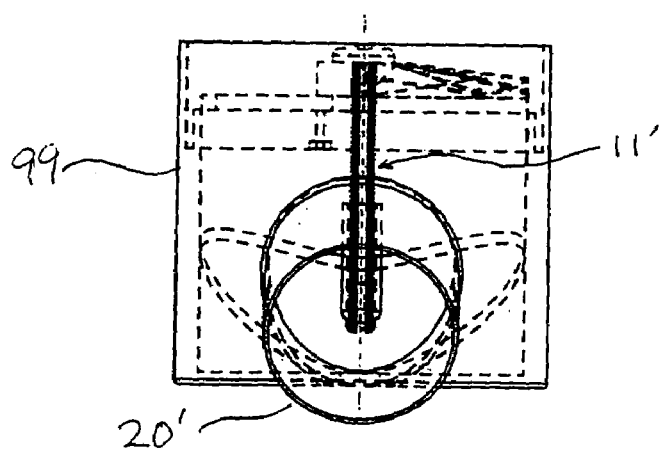
FIG. 22 is a front elevation view of the pet food dispensing device.
Figure 23:
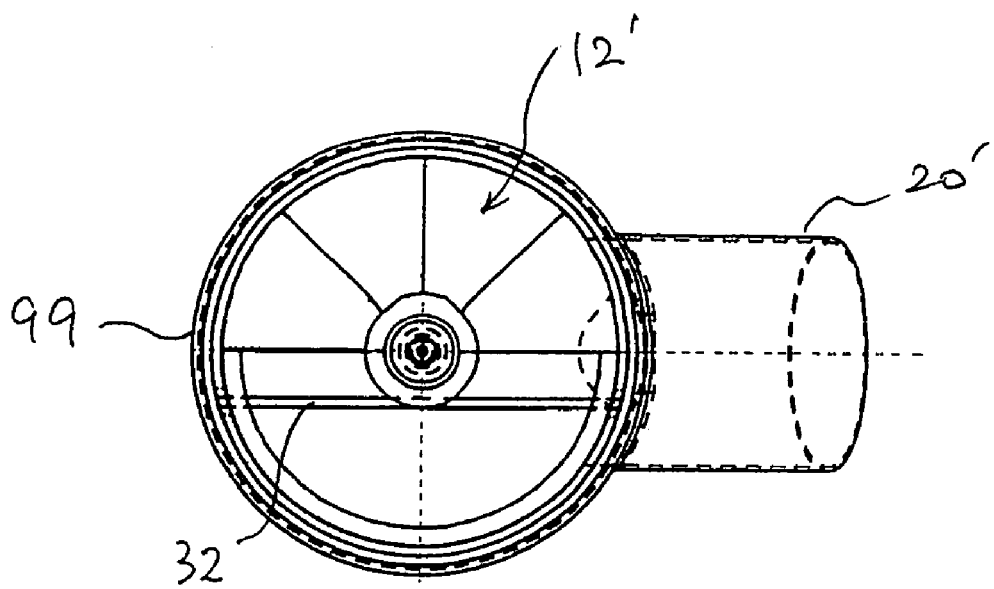
FIG. 23 is a plan view of the pet food dispensing device.
Figure 24:
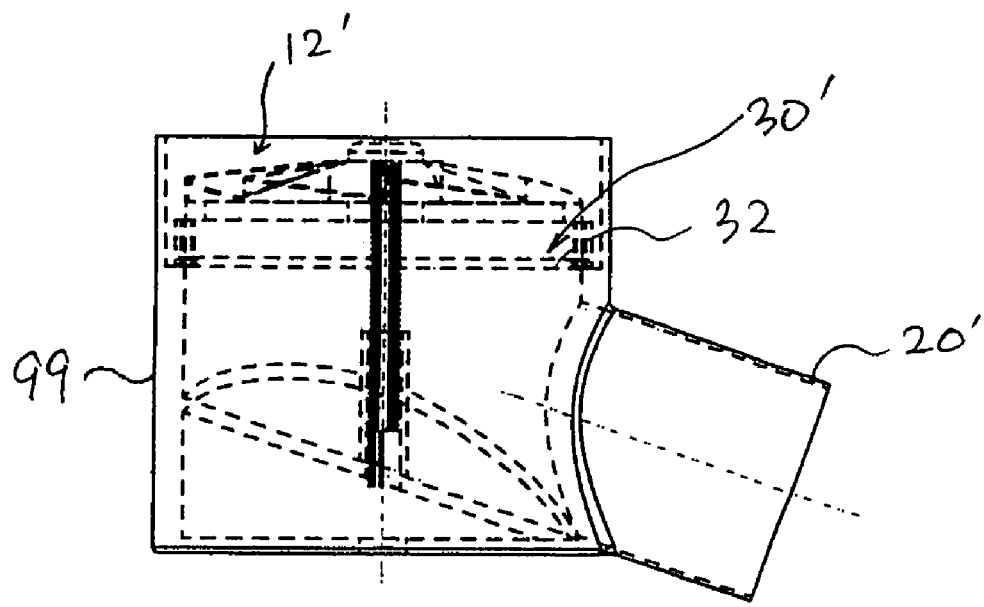
FIG. 24 is a side elevation view of the pet food dispensing device.
Figure 25:
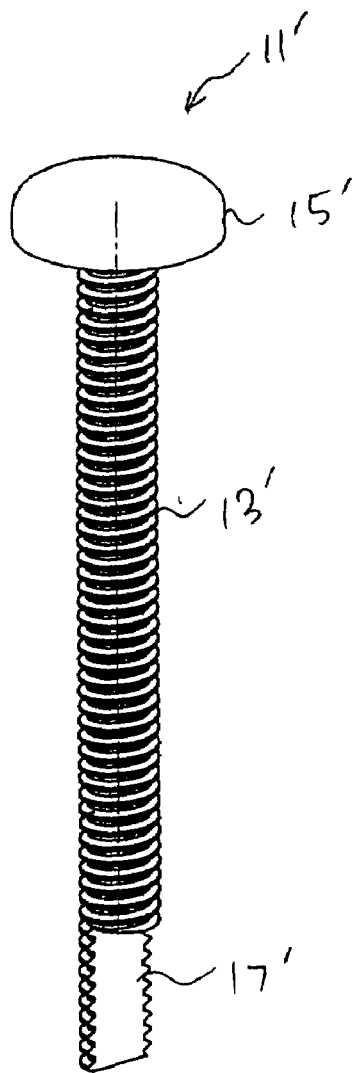
FIG. 25 is a perspective view of a shaft of the pet food dispenser.
Figure 26:
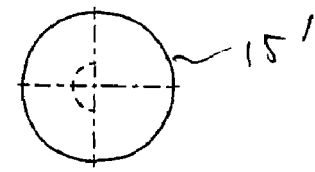
FIG. 26 is a plan view of the shaft.
Figure 27:
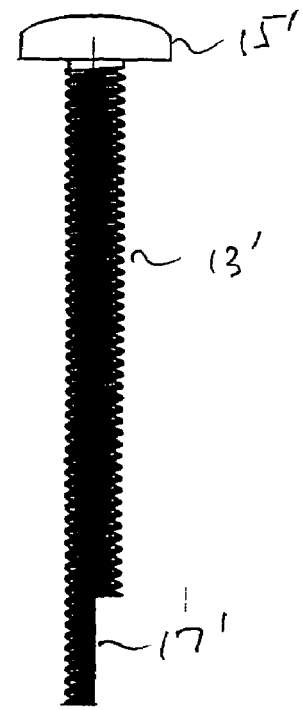
FIG. 27 is a side elevation view of the shaft.
Figure 28:
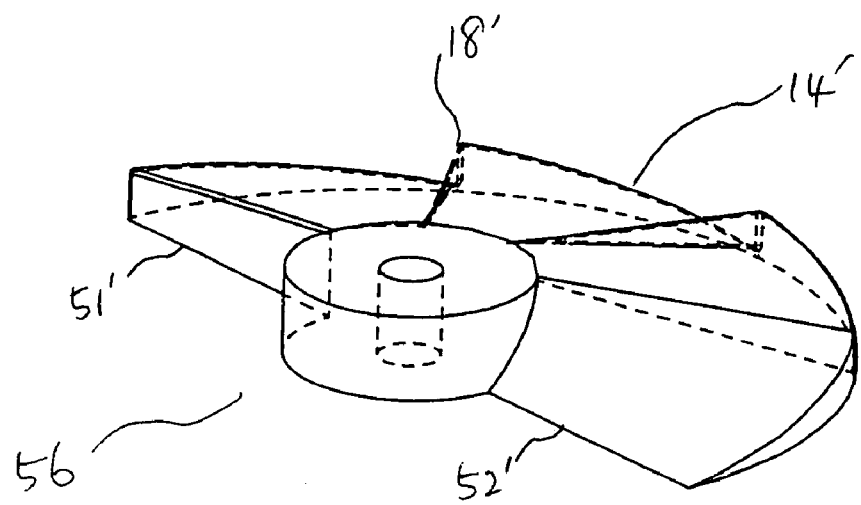
FIG. 28 is a perspective view of a top layer of the pet food dispensing disc.
Figure 29:
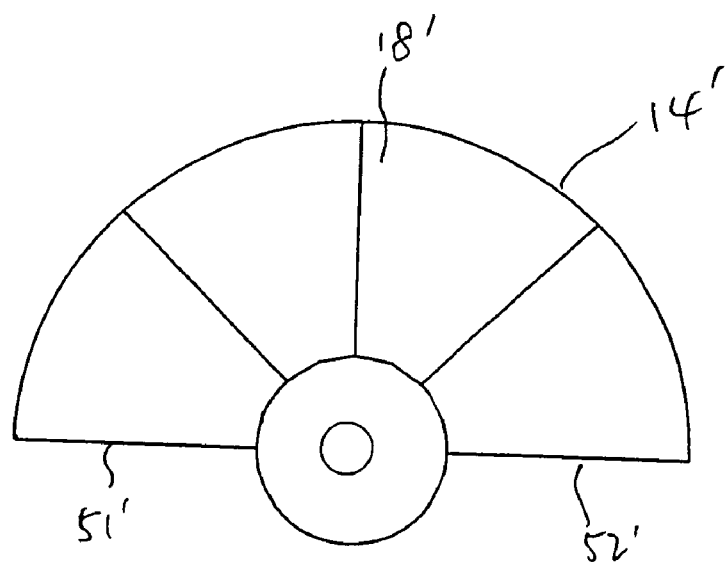
FIG. 29 is a plan view of the top layer of the pet food dispensing disc.
Figure 30:
FIG. 30 is a side elevation view of the top layer of the pet food dispensing disc.
Figure 31:
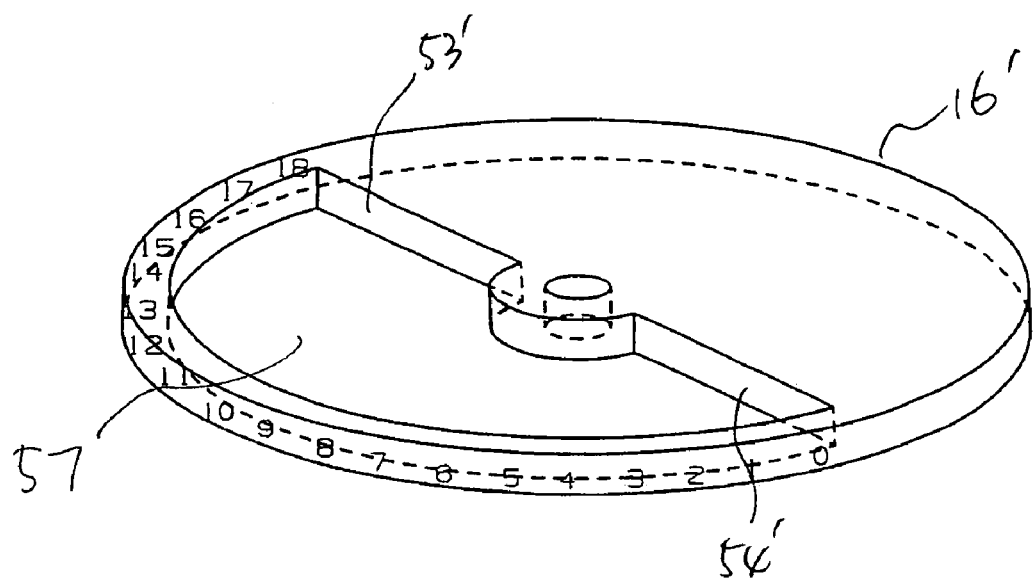
FIG. 31 is a perspective view of a bottom layer of the pet food dispensing disc.
Figure 32:
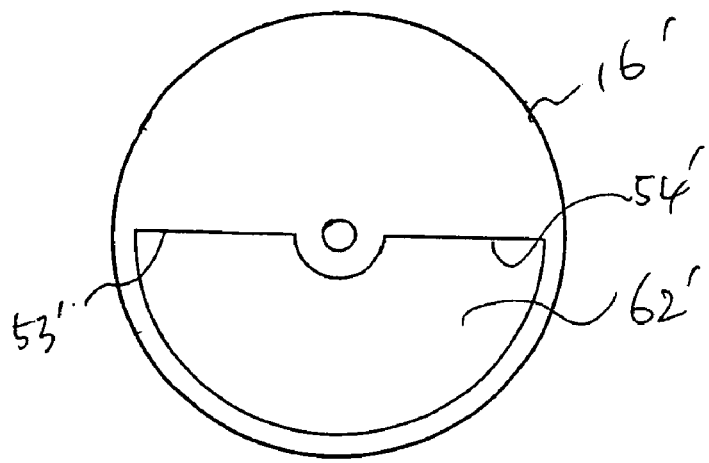
FIG. 32 is a plan view of the bottom layer of the pet food dispensing disc.
Figure 33:
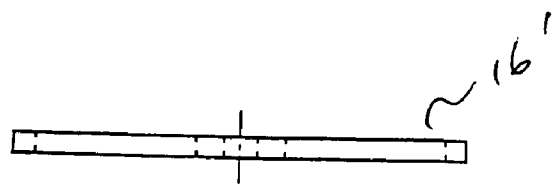
FIG. 33 is a side elevation view of the bottom layer of the pet food dispensing disc.
Figure 34:
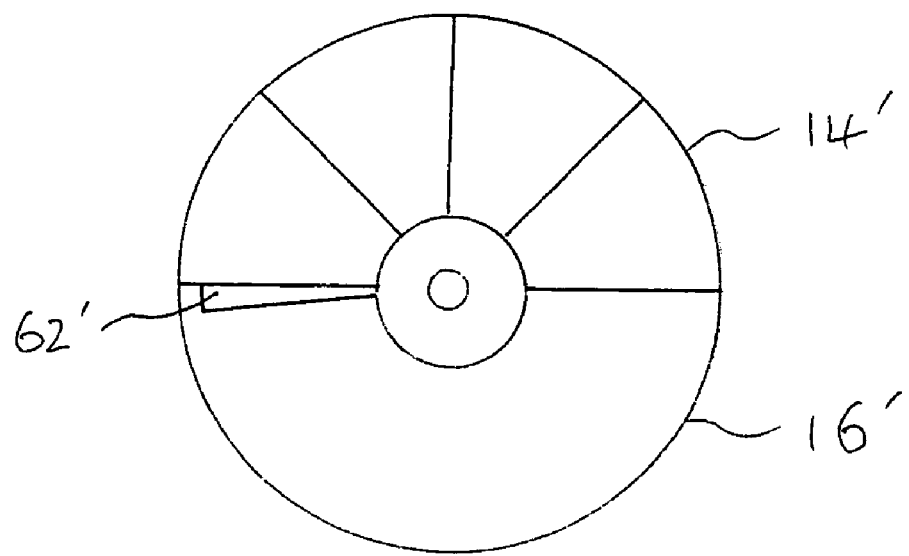
FIG. 34 is a plan view of the pet food dispenser with closed arc recess.
Figure 35:
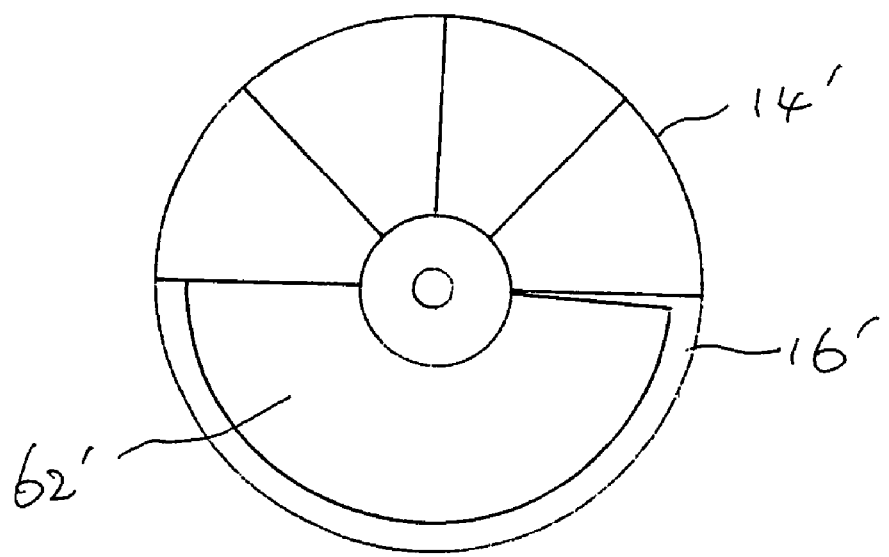
FIG. 35 is a plan view of the pet food dispenser with fully opened arc recess.

As shown in FIGS. 17 and 18, the shaft 11 of the pet food dispenser 12 engages with the slant guide 61 without friction through a hole 64 provided at the center of the slant guide 61.

FIGS. 21 through 41 show a second embodiment of the invention.

Figure 36:
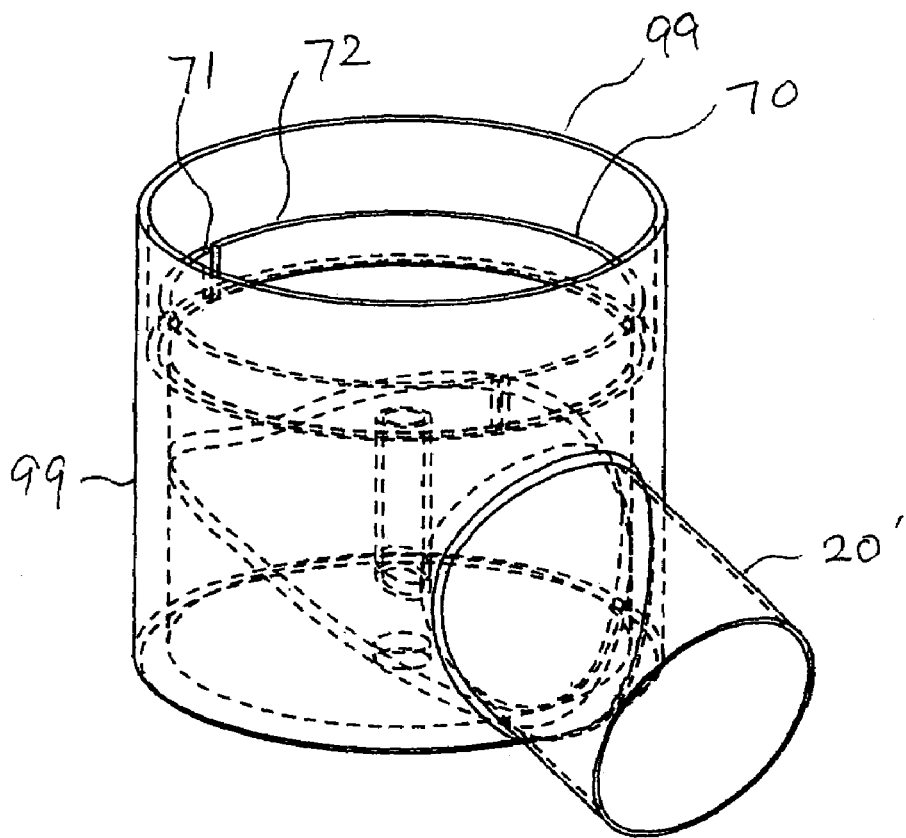
FIG. 36 is a perspective view of an outer case of the second embodiment.
Figure 37:
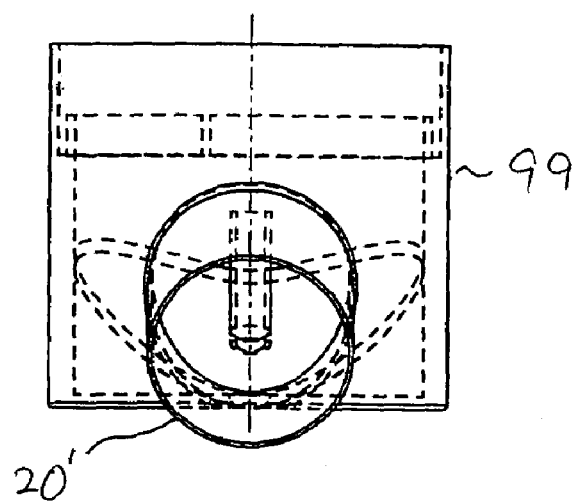
FIG. 37 is a front elevation view of the case of the second embodiment.
Figure 38:
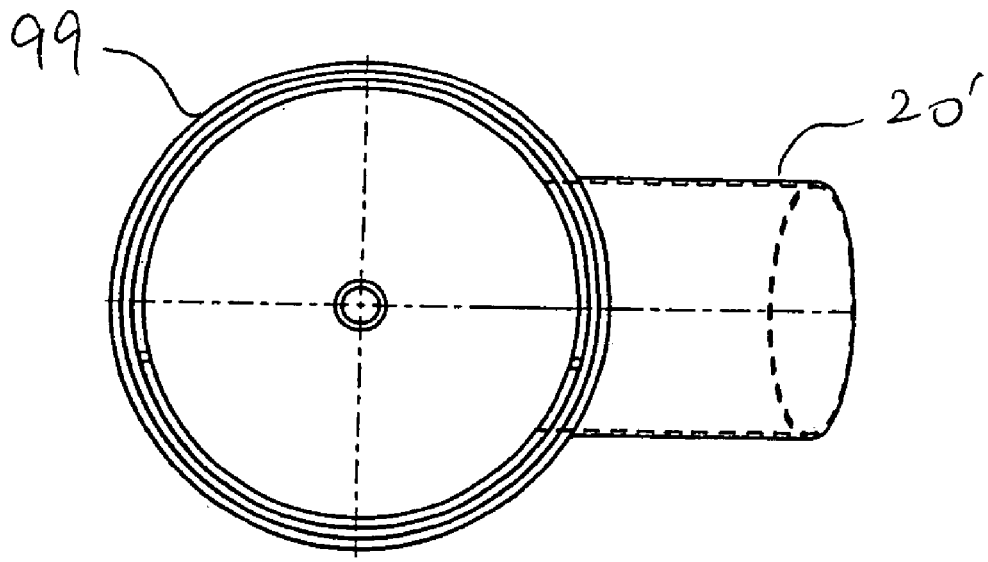
FIG. 38 is a plan view of the case of the second embodiment.
Figure 39:
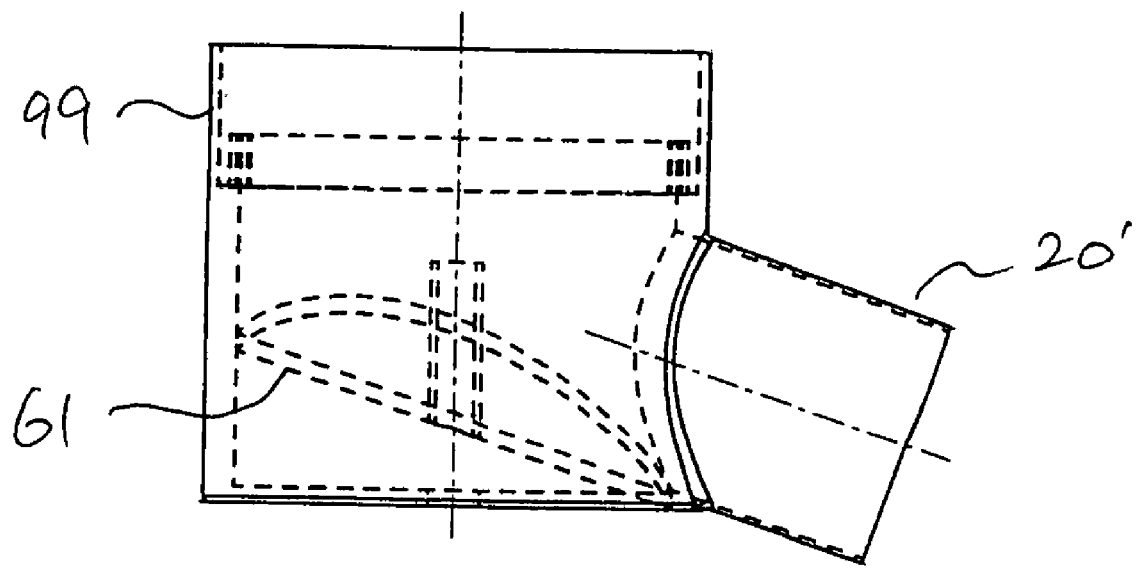
FIG. 39 is a side elevation view of the case of the second embodiment.
Figure 40:
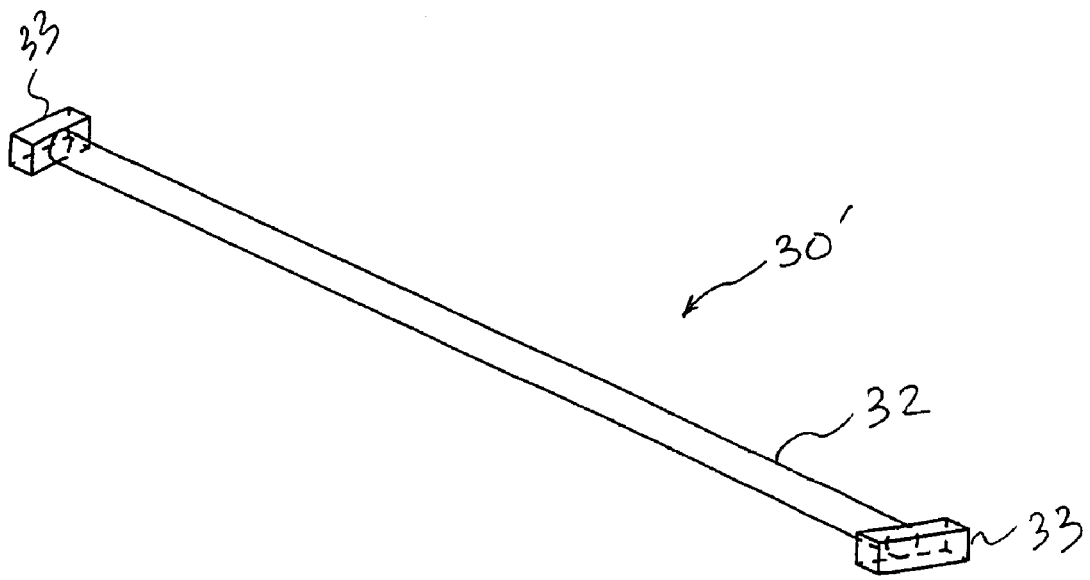
FIG. 40 is a perspective view of a stirrer of the second embodiment.
Figure 41:
FIG. 41 is a front elevation view of the stirrer of the second embodiment.
Figure 42:
FIG. 42 is a side elevation view of the stirrer of the second embodiment.
Figure 43:
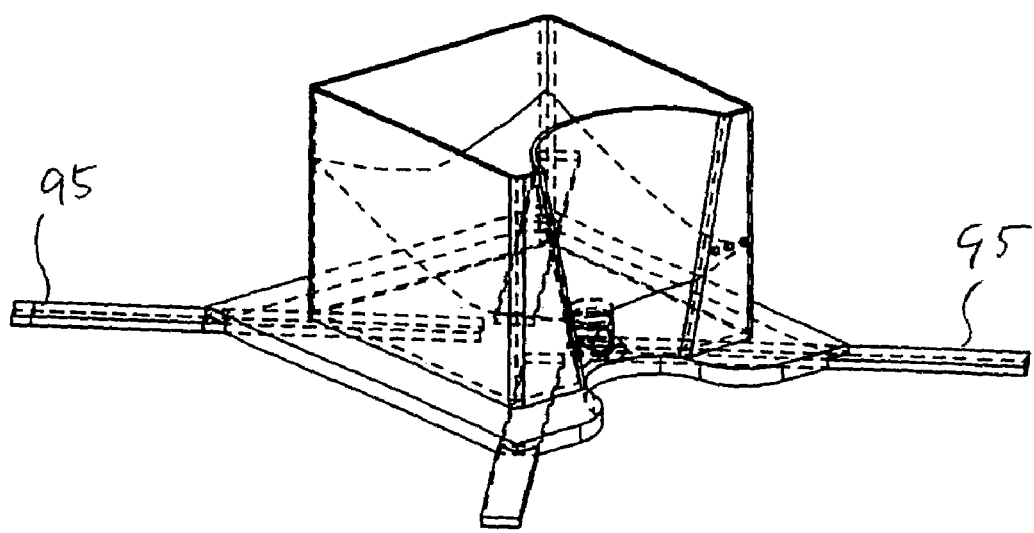
FIG. 43 is a perspective view of an outer case of a pet food dispensing device with supporting legs.
Figure 44:
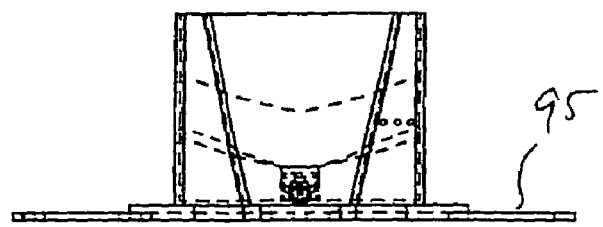
FIG. 44 is a front elevation view of FIG. 43.
Figure 45:
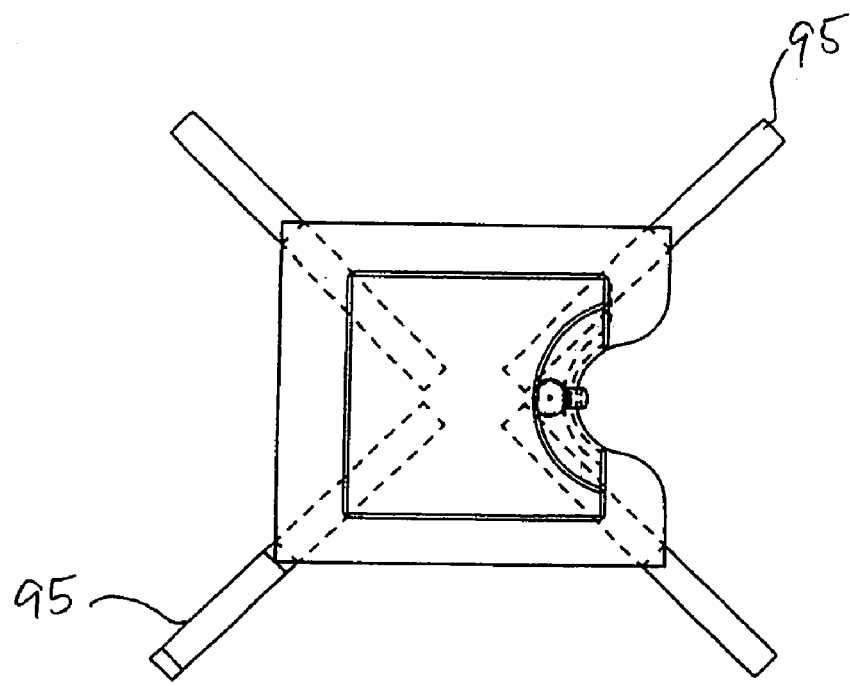
FIG. 45 is a plan view of FIG. 43.
Figure 46:
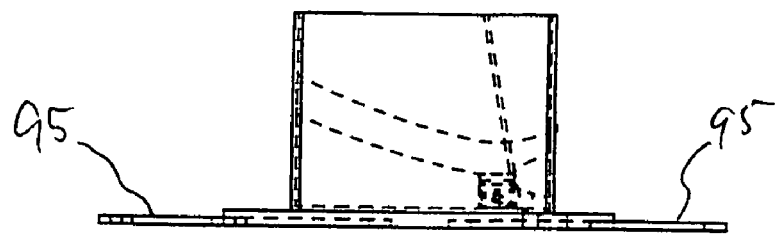
FIG. 46 is a side elevation view of FIG. 43.

In the second embodiment of the invention, the stirrer 30' of the pet food dispenser 10' includes a string member 32. As shown in FIGS. 36 and 40, the dispensing device 200 includes an inner case 70. The string member 32 straddles on grooves 71 provided on the upper perimeter 72 of the inner case 70 of the pet food dispenser 10'. The stirrer 30' is made of material with high elasticity.

As shown in FIGS. 25 through 29, the shaft 11' of the pet food dispenser 10' includes a head portion 15', a cylinder portion 13', partially flattened tail portion 17', and is fixed securely to the top layer 14' of the dispensing disc 12' and engaged with the bottom layer 16' of the dispensing disc 12' with a predetermined friction.

The top layer 14' has substantially semi-circular shape and the bottom layer 16' includes a cutout portion 62', and each of the layers 14', 16' includes a first edge 51', 53' and a second edge 52', 54'. The angle of the arc recess 62' defined by the second edge 52' of top layer 14' and the first edge 53' of the bottom layer 16' varies from zero (refer to FIG. 34) to one hundred eighty degrees (refer to FIG. 35).

The opening angle formed by the two grooves 71 with respect to the center of the dispensing disc 12' is between ninety degrees and one hundred eighty degrees, wherein the stirrer 30' straddling the grooves 71 is positioned below the arc recess 62' of the dispensing disc 12'. The string member 32 further includes stoppers 33 on both ends.

Figure 47:
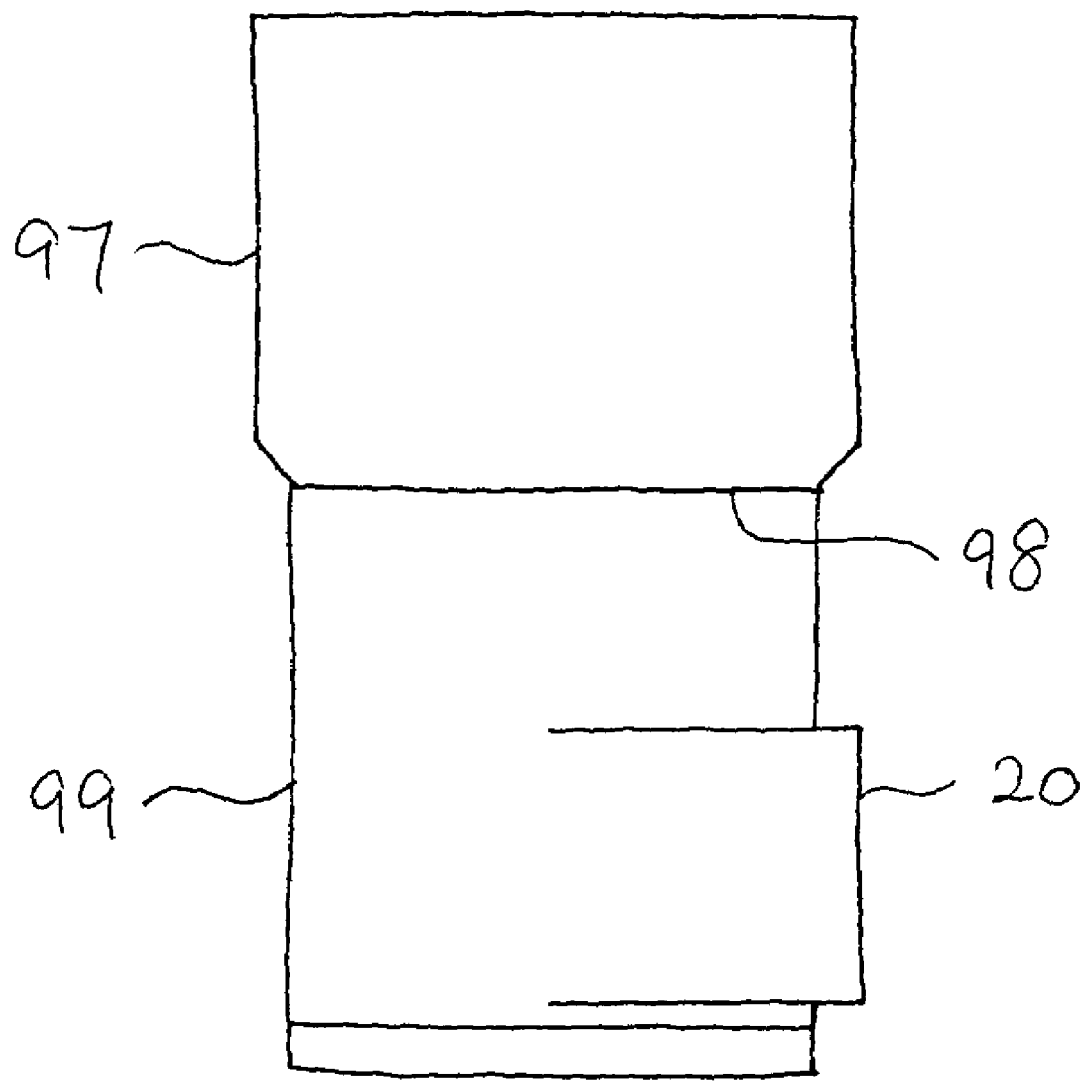
FIG. 47 is a side elevation view of the pet food dispensing device with the pet food container installed.

In each of the above embodiments, the automatic pet food dispensing device 100, 200, further includes a pet food container 97, a slant guide 61, a driving device (not shown) for powering the pet food dispensing device 100, 200, and one or more dispensing spouts 20. The pet food container 97 is detachably accepted to the top 98 of the outer case 99 as shown in FIG. 47.

The slant guide 61 of the pet food dispenser 10 has a downhill slope with a predetermined angle toward the dispensing spouts 20, and is integrally formed with the outer case 99.

The bumps 18, 18' on the top layer 14, 14' of the dispensing disc 12, 12' are radial and protruding upward. The radial bumps 18, 18' have a cross-sectional shape of isosceles triangle 18 or saw-tooth 18' tilted according to the rotating direction of the dispensing disc 12, 12'.

FIGS. 43 through 46 show a pet food dispensing device with supporting legs 95. The pet food dispensing device 300 further includes a plurality of supporting legs 95 long enough to prevent toppling along the bottom of the pet food dispensing device 300. The horizontal legs 95 increase the stability of the pet food dispensing device 300 a lot, preventing it from toppling in spite of dog's wild movements.

The driving device includes an electrical motor, which can be powered by a battery or from a wall outlet.

The driving device engages with and drives the shaft 11, 11' of the pet food dispenser 12, 12'.

The prototype of an automatic pet food dispensing device according to the present invention was tested with various types of commercially available dog food. On average, the device clogged only four times around the mouth of the pet food container while dispensing 3,860 cups of dog food. Considering that a dog of mid-size (36 to 50 lbs) consumes about two cups of dog food a day, the dispensing device clogs just once every 1.5 years. The four clogs in the experiments were directly due to a cellophane tape lining, which collects the pet food grains around its ruffle, inside the pet food container, not the pet food dispenser. Therefore, the inventor expects a far better result with production models.

Although the invention has been shown and described in considerable detail and are pointed out in the annexed claims, other versions are possible by converting the aforementioned construction. Therefore, the scope of the invention shall not be limited by the specification specified above.

What is claimed is:

1. An automatic pet food dispensing device comprising:
  a) a pet food dispenser comprising a shaft, a dispensing disc attached to the shaft, a flexible stirrer for stirring jammed pet food particles; and
  b) an outer case housing the pet food dispenser, wherein the dispensing disc comprises a top layer and a bottom layer, where the top and bottom layers of the dispensing disc are positioned adjacently, wherein the top layer includes a top cutout portion and the bottom layer includes a bottom cutout portion, wherein the top cutout portion and the bottom cutout portion are adjustable with respect to each other to adjust an area formed by the top cutout portion and the bottom cutout portion, wherein the top layer of the dispensing disc comprises one or more bumps on the top surface, and
  wherein the top and bottom layers have substantially semi-circular shape, wherein each of the layers comprises a first edge and a second edge, wherein an angle of an arc recess defined by the second edge of top layer and the first edge of the bottom layer varies from zero (0) to one hundred eighty (180) degrees.

2. The automatic pet food dispensing device of claim 1, wherein the stirrer of the pet food dispenser comprises a first flap extended from the first edge of the bottom layer of the dispensing disc, wherein the first flap is bent downwardly below the horizontal plane.

3. The automatic pet food dispensing device of claim 1, wherein the shaft of the pet food dispenser comprises a cylinder portion, a stopper ring portion, and a connecting cylinder portion, wherein the shaft is fixed securely to the top layer of the dispensing disc and engaged with the bottom layer of the dispensing disc with a predetermined friction, wherein the stopper ring portion is fixed at a predetermined position along the cylinder portion to keep the top and bottom layers of the dispensing disc at the predetermined position, wherein the connecting cylinder portion comprises a first end, and a second end, and is fixed with the cylinder portion, wherein the connecting cylinder portion comprises an inverted-L shaped slit at the second end.

4. The automatic pet food dispensing device of claim 3, wherein the second end of the connecting cylinder portion is engaged with the driving device.

5. The automatic pet food dispensing device of claim 3, wherein the cylinder portion comprises external threads, wherein the stopper ring portion and the connecting cylinder portion comprise internal threads matching with the external threads of the cylinder portion.

6. The automatic pet food dispensing device of claim 1, wherein the second edge of the top layer of the dispensing disc comprises a second flap bent downwardly below the horizontal plane.

7. The automatic pet food dispensing device of claim 1, wherein the stirrer of the pet food dispenser comprises a string member, wherein the pet food dispenser further comprises an inner case, wherein the string member straddles on grooves provided on the upper perimeter of the inner case of the pet food dispenser.

8. The automatic pet food dispensing device of claim 7, wherein the stirrer is made of material with high elasticity.

9. The automatic pet food dispensing device of claim 7, wherein the shaft of the pet food dispenser comprises a head portion, a cylinder portion, partially flattened tail portion, wherein the shaft is fixed securely to the top layer of the dispensing disc and engaged with the bottom layer of the dispensing disc with a predetermined friction.

10. The automatic pet food dispensing device of claim 7, wherein the top layer has substantially semi-circular shape and the bottom layer comprises a bottom cutout portion, wherein each of the layers comprises a first edge and a second edge of the openings, wherein the angle of the arc recess defined by the second edge of top layer and the first edge of the bottom layer varies from zero (0) to one hundred eighty (180) degrees.

11. The automatic pet food dispensing device of claim 1, further comprising:
a) a pet food container comprising a top end and a bottom end;
b) a slant guide;
c) a driving device powering the pet food dispenser; and
d) one or more dispensing spouts leading the pet food from the space formed by the bottom of dispensing disc.

12. The automatic pet food dispensing device of claim 11, wherein the slant guide of the pet food dispenser has a downhill slope with a predetermined angle toward the dispensing spouts.

13. The automatic pet food dispensing device of claim 12, wherein the slant guide is integrally formed with the outer case.

14. The automatic pet food dispensing device of claim 1, wherein the one or more bumps on the top layer of the dispensing disc are radial and protruding upward.

15. The automatic pet food dispensing device of claim 14, wherein the one or more radial bumps have a cross-sectional shape of isosceles triangle or saw-tooth tilted to the direction of rotation of the dispensing disc.

16. The automatic pet food dispensing device of claim 1, further comprising a plurality of supporting legs along the rim of the bottom of the pet food dispensing device.

17. The automatic pet food dispensing device of claim 1, wherein the pet food container is detachably accepted to the top of the outer case.

* * * * *